United States Patent [19]

Wenzlick et al.

[11] Patent Number: 4,601,523
[45] Date of Patent: Jul. 22, 1986

[54] DRAWER FOR FURNITURE

[75] Inventors: Erich Wenzlick, Durlangen; Hermann Rothfuss, Waiblingen, both of Fed. Rep. of Germany

[73] Assignee: BBP-Kunststoffwerk Marbach Baier GmbH und Co. KG, Marbach, Fed. Rep. of Germany

[21] Appl. No.: 605,568

[22] Filed: Apr. 30, 1984

[30] Foreign Application Priority Data

May 5, 1983 [DE] Fed. Rep. of Germany ... 8313250[U]

[51] Int. Cl.⁴ .............................................. A47B 88/04
[52] U.S. Cl. ................. 312/330 R; 403/262; 403/407.1
[58] Field of Search .............................. 403/262, 407; 312/330 R, 265

[56] References Cited

U.S. PATENT DOCUMENTS

| 2,701,174 | 2/1955 | Franks | 312/330 R |
| 2,962,334 | 11/1960 | Dutmers | 312/265 X |
| 4,230,382 | 10/1980 | Wenzlick et al. | 312/330 R |
| 4,303,289 | 12/1981 | Hardy | 312/330 R |
| 4,438,994 | 3/1984 | Davis | 312/330 R |

FOREIGN PATENT DOCUMENTS

3024972 2/1980 Fed. Rep. of Germany .
3030199 2/1980 Fed. Rep. of Germany .

Primary Examiner—William E. Lyddane
Assistant Examiner—Joseph Falk
Attorney, Agent, or Firm—Michael J. Striker

[57] ABSTRACT

A drawer for an article of furniture includes a front sheeting, a back portion and two parallel side portions extended between the front sheeting and the back portion. Both side portions are formed identically and may be interchanged. Each side portion has a rear end recess, which receives the end of the back portion, and a front end recess which receives a fastener for connecting each side portion to the front sheeting. The front end recesses and the fasteners positioned therein are enclosed with caps formed to provide an access to the fasteners and at the same time closing the latter from above.

23 Claims, 9 Drawing Figures

DRAWER FOR FURNITURE

BACKGROUND OF THE INVENTION

The present invention relates to a drawer, particularly a drawer for furniture.

Drawers insertable in openings provided in articles or furniture have been known in the art.

Known drawers of the type under discussion include a bottom portion, two guide rails laterally engaged with the bottom portion, a front sheeting, a pair of parallel side portions, and a back portion extended between the rear ends of the side portions.

The side portions of the known drawers, disclosed, for example in German publication DE-OS No. 3024972; DE-OS No. 30 30199, are formed of individual components; such side portions and individual elements are manufactured so that eventually certain components are assembled to form left-hand side portions whereas the other certain components can be assembled only to form right-hand side portions of the drawer. An interchanging of the structural components to produce both side portions of the drawer had been impossible. Although efforts have been made to manufacture furniture drawers of plastics by spray molding to make each individual component in a single mold these efforts had resulted in very high costs. Inasmuch as during the assembling of the individual component parts a user should pay attention as to which components belong to the right-hand side portion and which components should be taken into consideration for the left-hand side portion the whole assembling process has been time-consuming.

Although the fastening means for fastening the side portions to the front sheeting are covered with special caps in the known drawers the access to the fastening means in the assembled drawer for adjusting or removing the bolts has been difficult because it has been required to disassemble the drawer or at least to displace the component parts relative to each other to expose the fastening means.

SUMMARY OF THE INVENTION

It is an object of the present invention to provide an improved drawer for an article of furniture.

It is another object of the present invention to provide an improved plastics drawer.

These and other objects of the present invention are attained by a drawer for an article of furniture, comprising a bottom portion, two guide rails laterally engaged with said bottom portion; a front sheeting; means for fastening said front sheeting to said guide rails; a pair of parallel side portions; a back portion; said side portions each having substantially a U-shaped cross-section and overlapping and covering a respective guide rail, said back portion extending transversally of said side portions; and a pair of caps mounted to the assigned side portions at front ends thereof as viewed from said front sheeting, said caps being held on the assigned side portions in the form-locking and/or force-locking manner, said side portions having front ends and rear ends and being open at said rear ends inwardly of the drawer and downwardly towards said bottom portion, said side portions each being formed at the rear end with a first recess to receive an end portion of said back portion therein, said side portions being identical and each being formed at the the front end with a second recess, the second recesses of said side portion each receiving the fastening means for fastening the assigned guide rail to said front sheeting, said caps being releasably connected to said front sheeting and entirely enclosing said second recesses and the fastening means received therein.

Due to the present invention the above indicated disadvantages of the conventional drawers for furniture can be avoided.

The drawer according to the invention is simple in construction and inexpensive in manufacture.

An easy access to the fastening means in the drawer is ensured by the construction of the proposed drawer.

The left-hand and the right-hand side portions in the drawer according to the present invention are totally identical to each other and therefore both can be manufactured of plastics by spray molding. Therefore, only a single mold can be utilized for producing the side walls of the drawer. The number of the expensive tools to be used can be reduced. Only one tool or mold should be maintained and adjusted. Thus manufacturing expenses of drawers are substantially reduced. Furthermore, only one inserting of the tool into the machine is sufficient to produce right-hand and left-hand side portions of the drawer. The idle time of the machine is substantially reduced. Since the right-hand and left-hand side portions are identical the time of assembling of the drawer is also significantly reduced. It is no longer necessary to specifically mark left-hand and right-hand side portions of the drawer.

The second recesses provided at the front ends of the side portions receive the fastening means and also provide for an easy access to those fastening means if necessary, for example to adjust the front sheeting to the remaining part of the drawer. The caps should not be removed from the drawer to provide an access to the fastening means.

Each of the side portions at the front and rear end thereof may have the cross-section of a rectangular hollow profile.

Each hollow profile may be open downwardly towards the bottom portion and also at one side thereof.

Each side portion may have an outer wall, an upper wall of the same length as said outer wall, and an inner wall parallel to said outer wall and of the length shorter than that of the outer wall.

At least the outer wall or the inner wall may be formed with an arm extended normally to said wall and formed at the free end of said wall.

The outer wall of each side portion may have two free ends and said inner wall may have two free ends also, said outer wall being formed with two arms on the free ends thereof and said inner wall being formed with two arms at the free ends thereof, the arms of the outer wall being projected in the same direction as the arms of the inner wall.

Each arm of the outer wall may define with each arm of the inner wall in a direction of elongation of said side walls an opening, said outer wall and said upper wall of each side portion limiting said first and second recess from outside and from above.

The inner wall of each side portion may be formed at each free end with a projection which extends in the direction of elongation of the side portion outwardly beyond the respective arm of the inner wall.

Each opening defined between the arm of the outer wall and the arm of the inner wall at a rear end of each side portion as viewed from said front sheeting, may have the width substantially corresponding to the width of said back portion, said back portion being slidably inserted with the end portions thereof into said openings so that the outer wall and the upper wall of each side portion secure said back portion against displacement.

The back portion of the drawer may be formed with two vertical grooves, in which the projections of the inner walls are engaged in a form-locking manner when the end portions are inserted into the openings, the outer wall of each side portion having an inner surface, the end portions of said back portion abutting against the inner surfaces of the outer walls of the side portions.

The back portion may include at two end portions thereof inserted into said openings two uprights and at least one elongated connecting element clamped in said uprights.

Each of the caps may be formed as a U-shaped shoe, each shoe having an inner arm and an outer arm parallel to said inner arm, said inner arm extending from said front sheeting to at least the arm of the inner wall of each side portion and overlapping the second recess of the respective side portion.

The inner arm and the outer arm of each shoe may be formed with a projection, the projections of the inner and outer arm of each shoe extending towards each other, said front sheeting having a backside, the projections of the inner and outer arm of each shoe abutting against said backside The fastening means each may include a fastening member formed with two opposing grooves, said outer and inner arm of each shoe being slidably insertable into said grooves.

Each of the shoes may itself form a fastening member, said fastening member being metallic and connected to the backside of the front sheeting, said fastening member being each arranged in each second recess of the respective side portion, said fastening member being adjustably engageable with the respective side portion at the front end thereof.

Each of the aforementioned uprights may be pivotable relative to said bottom portion and include a connecting portion connected to said bottom portion, and a hinge means, said hinge means being a film hinge and having an axis, said upright being pivotable about said axis to the bottom portion.

Due to the provision of the shoes, which are detachable from the drawer upwardly and fixed to the front sheeting, it is ensured that the front end recesses accommodating the fastening means are always clean and reliably covered. The danger that the usually occuring at this place gaps or spacings would be contaminated is avoided. The arms of the shoes and the end portions of the walls of the side portions overlap each other, and contamination of the front end recesses is therefore prevented.

Due to the fact that the front end arms of the shoes are positioned in the above mentioned grooves the relative parallel displacement between these arms and the backside of the front sheeting is avoided. Since the shoes, during the adjustment, are displaced together with the front sheeting relative to the remaining portion of the drawer it is ensured that the fastening means are completely covered and no gaps between the front sheeting and the remaining portion of the drawer occur.

The back portion may be formed of a single plate or may be made of a number of elements as mentioned above.

The provision of the pivotable uprights at the rear ends of the side portions facilitates storage and shipment of the drawer. The uprights can be easily inserted into respective rear end recesses during the assembling and held therein in a form-locking fashion. An elongated element connecting two uprights at the rear ends of the side portions may be a bar or a plate insertable into the hollow uprights.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
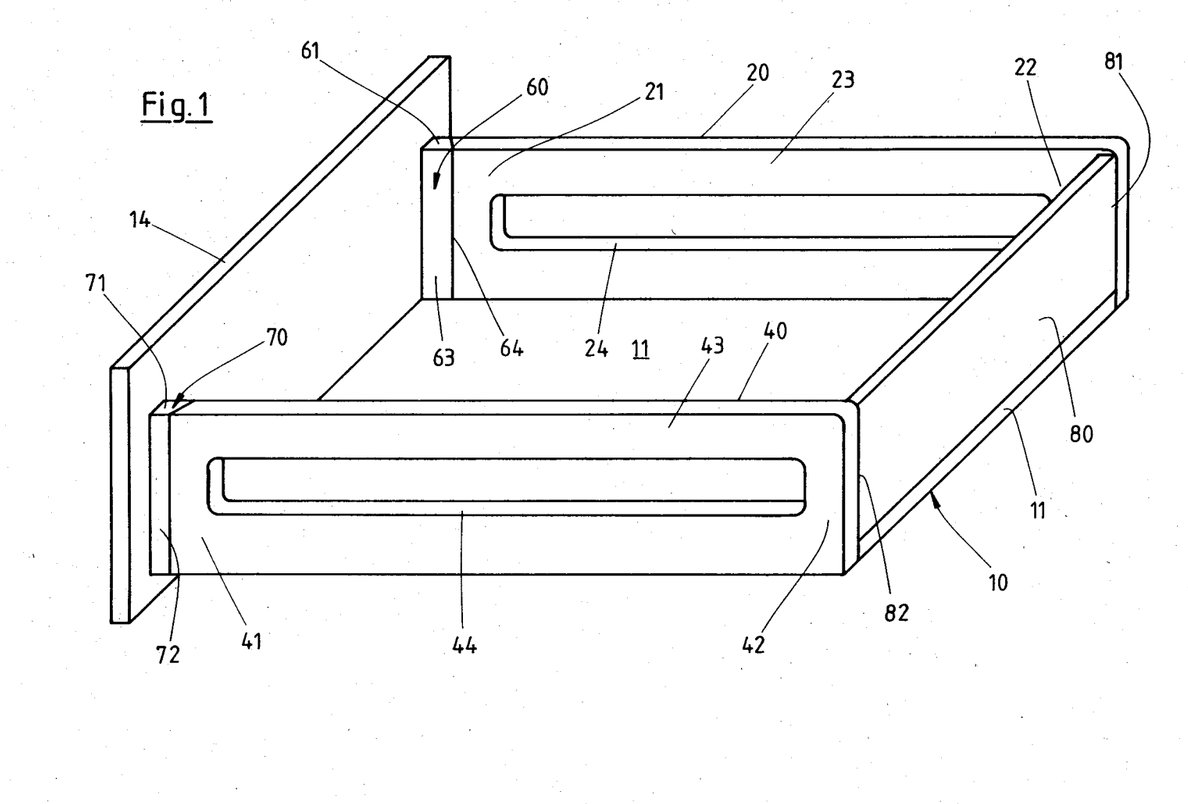
FIG. 1 is a perspective schematic view of an extractable drawer for a furniture article.
Figure 2:
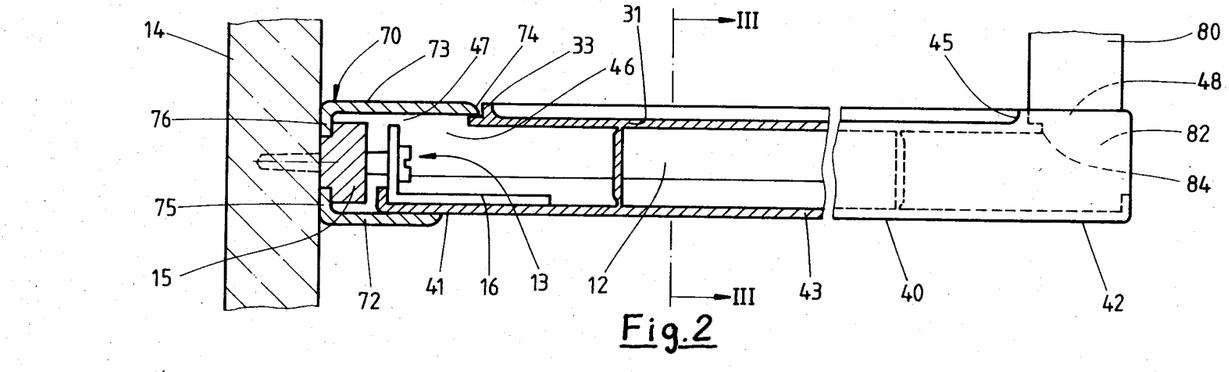
FIG. 2 is a schematic top plan view, partially in section, of the drawer of FIG. 1.

Drawers, and particularly drawers for a kitchen furniture of various constructions have been known as noted above (DE-OS No. 3,024,972). With reference to FIGS. 1 and 2 it can be seen that the drawer according to the present invention is designated by reference numeral 10. This drawer can be utilized for a kitchen furniture. The drawer 10 includes a bottom portion 11 engaged at two lateral sides thereof in guide rails 12, secured thereon by means of screws (not shown).

Figure 3:
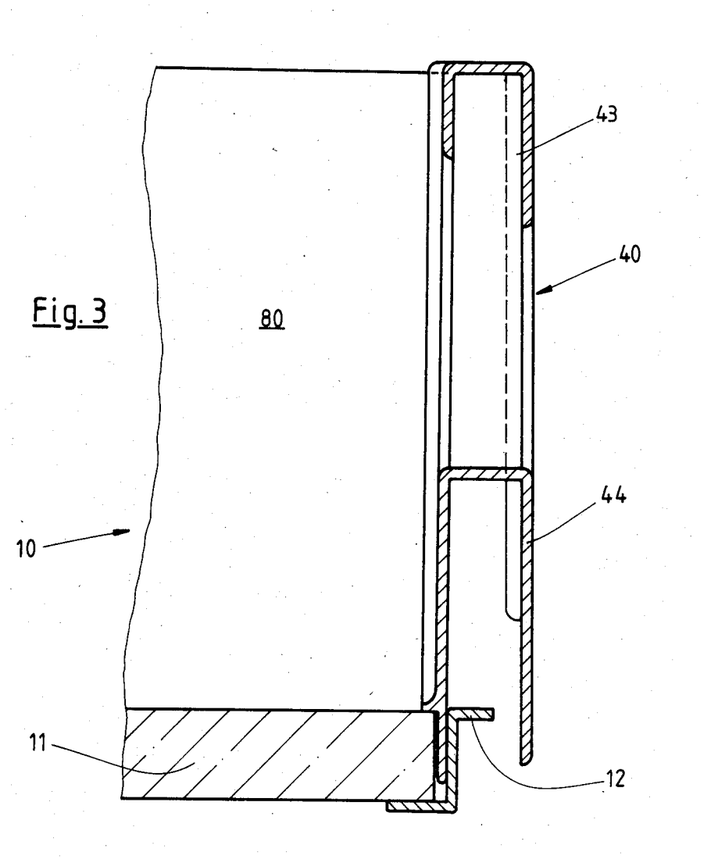
FIG. 3 is a partial sectional view taken along line III—III of FIG. 2.
Figure 4:
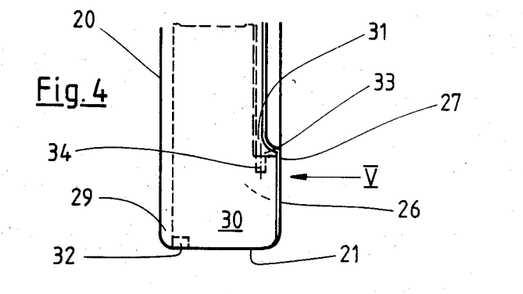
FIG. 4 is a top-plan view of the front end portion of the left-hand side of the drawer as viewed from the front sheeting.

A front sheeting 14 is connected to the guide rail 12 by means of two fastening arrangements 13 (only one fastening device 13 is shown in FIG. 2). Each fastening arrangement 13 is formed of two fastening elements 15, 16, of which the fastening element 15 is secured to the front sheeting 14 and another fastening element 16 is rigidly connected to the guide rail 12 and is projected from that rail upwardly so as to form an angular bracket in the known fashion Drawer 10 further comprises two parallel side portions 20 and 40, each of which is formed as a single piece by a spray molding and made of synthetic plastic material. Each side portion 20, 40 has a front end portion 21, 41 and a rear end portion 22, 42. The front and rear end portions in the both side portions of the drawer are identical. The end and rear portions of each side portion of the drawer are integrally connected to each other in the longitudinal direction of the drawer by elongated bars. The end portions 21 and 22 are interconnected by parallel bars or elongated cross-pieces 23, 24 whereas the end portions 41 and 42 are interconnected by elongated cross-pieces 43, 44 as can be clearly seen from FIG. 1. All longitudinal cross-pieces 23, 24 and 43, 44 extend parallel to each other and cross-pieces 23 and 24 as well as cross-pieces 43 and 44 are vertically spaced from each other to form windows therebetween. Lower cross-pieces 24 and 44 must be as smooth as possible at their undersides and should be connected with the upper side of bottom portion 11 without any gap or spacings. As can be seen from FIG. 3, each cross piece 23, 24, 43, 44 has a U-shaped cross-section. The guide rail 12 engages in the lower cross-pieces 24, 44 from below so as to cover those cross-pieces. The lower cross-pieces 24, 44 are clamped between the bottom portion 11 and the guide rails 12. The upper elongated cross-pieces 23, 43 can receive within the hollows formed therein a displaceable subdivider which is not shown herein. Fasteners or holders can be also inserted in those hollows, in which holders a transverse partition or subdivider, extended between side portions 20 and 44 and insertable from below upwardly or from inside outwardly, can be engaged and thereby held.

Drawer 10 further includes a back portion 80 which has two rear ends 81 and 82 at which the back portion 80 is held between the rear end portions 22 and 42 of the sides 20 and 40. In the embodiment of FIGS. 1 and 2 the back portion 80 including its ends 81, 82 is formed as a single piece which is smooth and stepless and made, for example of a chip board cut to a required size. The back portion 80 is positioned on the bottom portion 11 or can project downwardly beyond bottom portion 11 whereby the bottom portion will then abut with its smallest rear side against the inner surface of back portion 80 or will be engaged in a special groove provided in the back portion.

As can be seen from FIG. 2 left-hand and right-hand caps in the form of shoes 60, 7 are connected to the front sheeting 14 in the form-locking and/or force-locking fashion. Each cap or shoe 60, 70 has a somewhat U-shaped cross-section and is made from plastics. Shoes 60 and 70 overlap respective front end portions 21 and 41 at least at the location of the corresponding fastening arrangement 13. Therefore shoes 60 and 70 fulfill not only a decorative function but also function of protection of the fastening elements against contamination. Shoes 60, 70 also cover the joints between the front sheeting 14 and two side portions 20 and 40, which result when the front sheeting 14 is adjusted to the side portions 20 and 40 of the drawer within the plane of the front sheeting and also transversally to that plane during the adjustment of the drawer to the front of the furniture article.

The rear end portion 22, 42 of each side portion 20, 40 is provided at its rear end with a recess 25, 45, which is open inwardly and at the same time downwardly of drawer 10. Each recess 25, 45 serves the purpose of receiving and holding the respective end 81, 82 of the back portion 80

As can be clearly seen from FIG. 2 the front and rear end portions of each side 20 and 40 are formed identically. Recesses 26 and 46 are provided at the front ends of side portions 20, 40 similarly to the recesses 25, 45. Therefore the shape of each side portion 20, 40 is such that the front end portion 21, 41 is shaped exactly as the rear end portion 22, 42 and these side portions are mirror-inverted in respect to the central longitudinal axis of the drawer thus forming the right-hand side portion 40 and the left-hand side portion 20 as considered from the front sheeting 14. If, for example the left-hand side portion 20 is rotated 180° about the axis perpendicular to the bottom portion 11 side portion 20 can be used on the right-hand side as the right-hand side portion 40. This shape ensures that only a single tool or mold for manufacturing side portions 20, 40 of plastics can be utilized, which substantially reduces costs of the drawer.

Recesses 26, 46 provided in the front end portions 21, 41, respectively, open downwardly at openings 27, 47 in the same fashion as rear end recesses 25, 45 which open downwardly at openings 28, 48. Front end openings 27 and 47 form internal access openings to provide access to fastening arrangements 13 when the shoes 60, 70 are removed from the drawer so that the fastening elements can be adjusted without the necessity of dismantling the front sheeting 14 and/or side portions 20, 40. The adjustment of the fastening means 13 would be therefore as simple as in the case of assembling and disassembling of the fastening elements.

Figure 5:
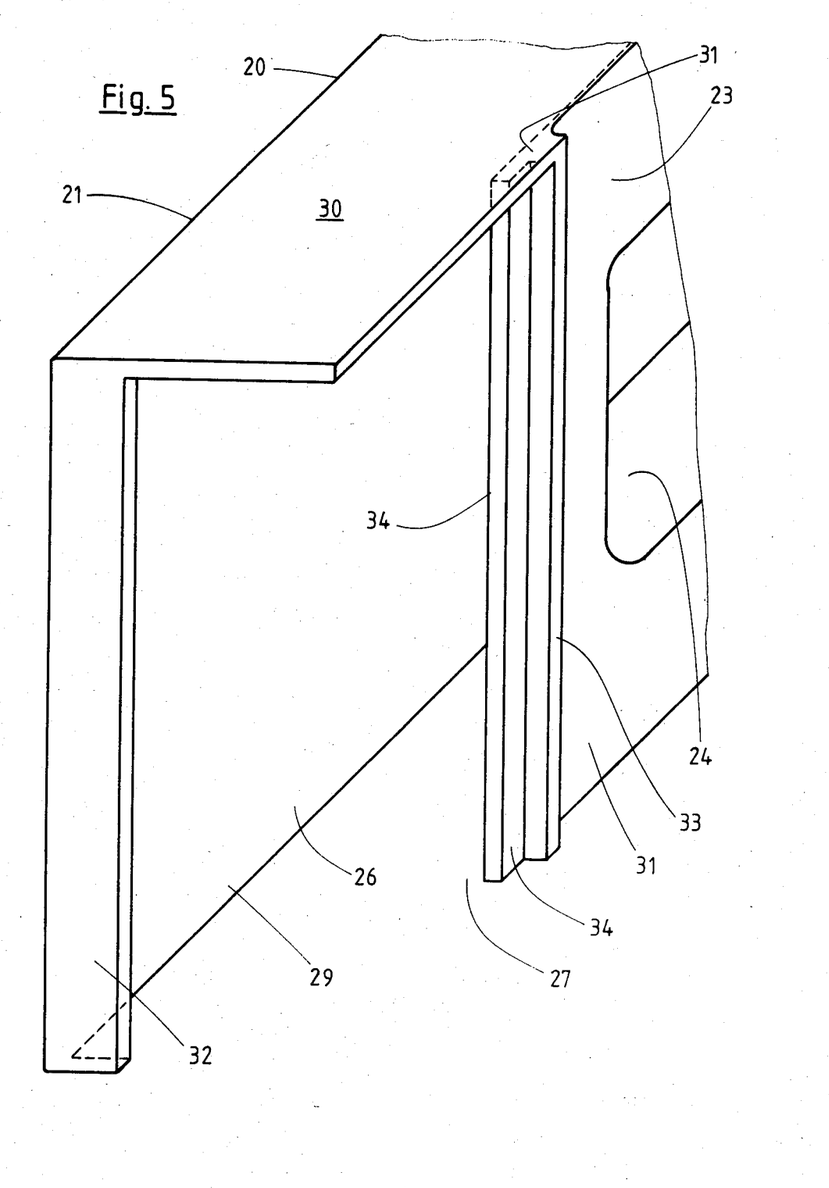
FIG. 5 is a view in the direction of arrow V of FIG. 4.

As can be seen specifically in FIG. 5, which shows only left-hand side portion 20, each side portion has a somewhat rectangular hollow profile which is open from below and at its inner side. The specific shape of this hollow profile is explained in connection with FIGS. 2 and 5. This hollow profile has a smooth longitudinal wall 29, an elongated upper wall 30 of the same length as that of wall 29 and a shorter inner wall 31 opposite and parallel to wall 29. An arm 32 extended normally to wall 29 and inwardly therefrom is provided at each free end of wall 29. Another arm 33 which is parallel to arm 32 and projects in the same direction is formed at each free end of the shorter inner wall 31. Arms 32, 33 limit, as considered in the longitudinal direction of the drawer, the inwardly positioned opening 27, 28 and define the width of this opening. The outer wall 29 projecting in the longitudinal direction beyond the opening 27, 28 limits the recess 25, 26 outwardly. The upper wall 30, which projects beyond the width of opening 27, 28, limits the recess 25, 26 in the upward direction.

A vertically extended tongue 34 provided on the shorter inner wall 31 extends towards the arm 32 over the arm 33 and is formed practically over the extension of inner wall 31.

The back portion 80 has at its ends 81, 82 such a cross-section that its thickness at least substantially corresponds to the width of the respective opening 28, 48 provided between the arms 32 and 33. The back portion 80 is inserted from the lower open end into the rear recesses 25, 45 of the side portions 20, 40 so that it is held between the opposing faces of arms 32 and 33 provided at the rear end of each side portion. Thereby the back portion 80 is secured in the longitudinal direction at the front and rear faces thereof. Each end face of the back portion 80 abuts against the respective inner surface of outer wall 29 of each side portion 20, 40. The position of the back portion 80 is thereby also secured in the transverse direction. Upper wall 30 of each side portion overlaps the ends 81, 82 of the back portion 80 so that the upper wall 30 forms a stop and secures back portion 80 against being pulled out upwardly. The securing of the position of back portion 80 in the downward direction is fulfilled by supporting the back portion 80 against the bottom portion 11 or in another fashion as will be described hereinafter. Thus the back portion is readily insertable into the rear ends of the side portions on the one hand, and all the sides of the back portion 80 are reliably secured, on the other hand without, however a considerably large disturbing play or spacing between the abutting sides.

The aforementioned tongues 34 of both side portions 20 and 40, which are directed in the rearward direction form an additional securing of the positions of the elements of the drawer in place. Ends 81, 82 of back portion 80 each has a vertically and downwardly extended groove 83, 84 in which the respective tongue 34 is received. The width of each vertical groove 83, 84 substantially corresponds to the width of each tongue 34 of each side portion 20, 40. During the insertion of back portion 80 into the rear end portions of sides 20 and 40 from below each tongue 34 becomes engaged in the respective groove 83, 84 in the form-locking manner.

The U-shaped caps or shoes 60 and 70 have each a horizontal upper wall 61 or 71 and lateral arms 62, 63 or 72, 73 which extend from the upper wall 61, 71 downwardly up to the bottom portion 11 and rearwardly approximately up to the edges of the respective side portion 20 or 40. The inner arm 63, 73 of each shoe is longer than the outer arm 62, 72 of each shoe in the direction of elongation of the drawer to compensate for different lengths of respective walls 31 and 29 of each side portion 20, 40. The longer inner arm 63, 73 projects at least up to the respective transverse arm 33 of the inner wall 31. The inwardly positioned opening 27 or 47 will in this manner overlap the front end recess 26 or 46 over the entire width and height of that recess. The inner arm 63, 73 also functions as the inner wall of each side portion. Since the inner arm 63, 73 has a rearwardly extended edge or rim 64, 74 abutting against the inner surface of the front end tongue 34 a reliable joint of these elements at this point is provided, whereby a relative flexibility between the shoes 60, 70 held to the front sheeting and the side portion is possible.

FIG. 2 illustrates that the arms 72, 73 of shoe 70 have at their ends facing the front sheeting 14 inwardly extending projections 75, 76 which abut against the rear face of front sheeting 14. The lateral arms of shoe 60 have the same construction. Fastening element 15 of each fastening device 13 has two opposite cutouts or slots in which respective projections 75 and 76 are received and engaged in a form-locking fashion between the back side of front sheeting 14 and the bases of those cutouts. Each fastening element 15 is screwed into the front sheeting as can be seen in FIG. 2. Shoe 70 as well as shoe 60 are therefore rigidly connected to the front sheeting 14. Arresting or securing means, not-illustrated herein may be provided between the shoe 70, 60 and the fastening element 15 of each fastening device 13. Such arresting means can be formed as projections, tongues or the like abutments, which can be then placed with each other in a form-locking engagement when the shoe 70 is completely inserted into its final position. It is understandable that shoe 60 is interconnected between the front sheeting 14 and side wall 20 in the same manner.

Figure 6:
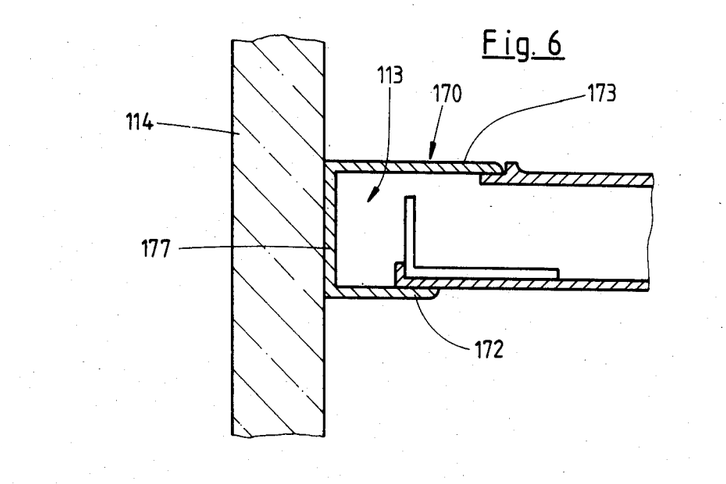
FIG. 6 is a sectional view of the front end portion of the right-hand side of the drawer as viewed from the front sheeting, according to a second embodiment of the invention.

Reference is now made to FIG. 6 which shows another embodiment of this invention. Only the component parts that are different from those of the embodiment of FIGS. 1–5 will be explained in detail with reference to FIG. 6. U-shaped arms 172, 173 of the shoe 170 have a connecting cross-piece 177 therebetween, which, abuts against the back face of front sheeting 114.

Such a cross-piece 177 can extend in the upper end region of shoe 170 in the event that shoe 170 fulfills only the function of covering the fastening device and is inserted into the respective side portion from above. The shoe 170 can be also formed as a portion of the fastening device as illustrated in FIG. 6 and can be rigidly secured directly to the back side of the front sheeting, for example by bolts. Thereby the shoe 170 has two functions. Firstly it forms a fastening element between the respective side portion and the front sheeting, comparable to the fastening device of FIG. 2, and secondly, shoe 170 functions as a means for covering the fastening elements, such as bolts. In the latter case the fastening device would be different from that of FIG. 2 and would be formed such that it would be accessible for adjusting and fastening laterally from outside or from below.

Figure 7:
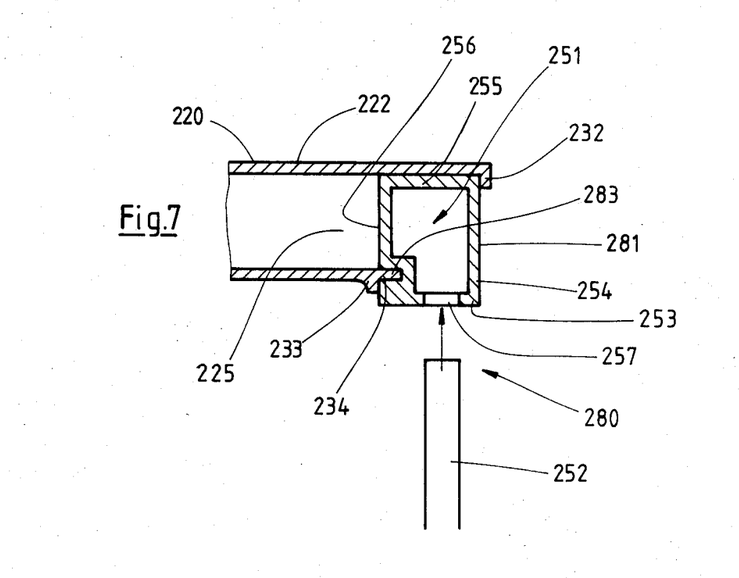
FIG. 7 a sectional view of the rear end portion of the left-hand side of the drawer as viewed from the front sheeting, according to a third embodiment of the invention.

In the third embodiment shown in FIG. 7 the multi-element back portion 280 is illustrated. Both ends of the back portion, of which only the left-hand end piece 281 can be seen in FIG. 7, are engaged within respective recesses 225 of the respective rear end portion 222 of each side portion of the drawer. Each end piece of the back portion is formed in this embodiment by a hollow upright 251. Uprights 251 have an internal space which receives one or more portions constituting the rear joint of the drawer. Such a portion can be an elongated rod, or a profiled strip, or a plate. This portion in FIG. 7 is schematically shown by a bar 252. Each upright 251 is rectangular in the cross-section. The upright 251 includes individual walls 253–256 which in the exemplified embodiment are connected into a single piece. The distance between wall 254 and wall 256 corresponds to the width of the opening provided by the distance between the arm 232 and arm 233. It is, of course, understood that the side portion 220 in this embodiment has the same construction as side portions 20 and 40 described in connection with FIGS. 1–5. The wall 256 facing the recess 225 is provided with a vertical groove 283 in which vertical tongue 234 is received. Bar 252 is insertable, for example into the upright 251 through an opening 257 formed in the wall 253.

In a modified non-illustrated construction walls 253 to 256 can be individual elements which would be assembled into a single unit, these individual elements can be displacable relative to each other or assembled immovably. Such individual walls 253 to 256 can have respective projections or inserting pins and recesses or arresting openings for receiving those pins to be assembled into a single unit.

In another modified non-illustrated embodiment walls 253 to 256 can be pivotable to each other or connected to each other at the corners of the unit by hinge joints, for example by hinge films. In order to facilitate storage and transportation such walls can be placed and stored practically in one plane. To assemble such individual walls they should be placed in a position shown in FIG. 7 and clamped with each other.

Figure 8:
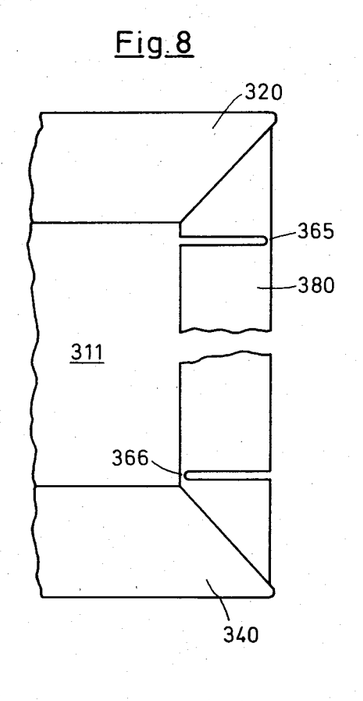
FIG. 8 is a top plan view of the rear end of the drawer according to a fourth embodiment of the invention.
Figure 9:
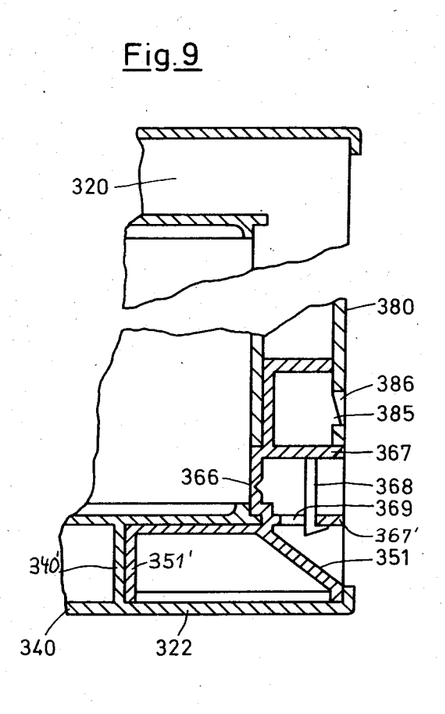
FIG. 9 is a sectional view of the rear end portion of the drawer of FIG. 8.

FIGS. 8 and 9 illustrate still another embodiment of the invention. The back portion of the drawer, which is here designated by reference character 380, is connected to the side portions 320 and 340 in a hinge-like manner. The axes of hinges are schematically shown in FIG. 8 as 365 and 366. These hinge axes 365, 366 extend substantially at right angles to the bottom portion 311, whereby the hinge axis 365 makes possible folding of the side portion 320 relative to the back portion 380 so that the both portions will extend somewhat parallel to each other. The hinge axis 366 makes possible a relative folding of the side portion 340 and back portion 380 so that these two portions will extend somewhat parallel to each other also. Thereby both side portions 320, 340 and back portion 380 can be placed in a stack-like manner and all three portions will lie parallel to each other so that a very small space would be required to transport individual portions of the drawer in the disassembled state. On the other hand, by a quick unfolding of these portions the assembled position shown in FIGS. 8 and 9 can be readily obtained.

The shape of the upright 351 in this embodiment can be seen in FIG. 9. Upright 351 is inserted into an opening of the rear end portion 322 in the same manner as shown for upright 251 in FIG. 7, with the exception that the upright 351 is longer than upright 251 and has an inner separating wall 351' abutting against the transverse wall 341' of the side portion 340. A connecting element 367 is pivotally connected to upright 351 by means of a joint, for example a film hinge in the case of the drawer made of plastics; upright 351 and connecting element 367 forming a single piece. The connecting element or portion 367 has a deformed hook portion 368, which in the position according to FIG. 9 projects through an opening 369 and becomes engaged behind the wall 367' so that the angle of 90° is formed between upright 351 and connecting element 367, whereby the connecting element remains in such an angular position and can not be disengaged from upright 351. The connecting element or portion 367 is so shaped that the back portion 380 can have the shape, for example of the hollow profile open at its one side, which can be placed onto the connecting element 367 in the horizontal direction. The end position of the back portion during such a mounting can be secured by an end stop. Another hook portion formed on the connecting element 367 is engaged and secured in an opening 386 of the back portion 380 so that the latter can not be pulled out from connecting element 367.

The left-hand side portion 320 is connected to the back portion 380 in the same manner as portion 340 shown in FIG. 9. The above described construction makes it possible that the drawer can be also transported in the assembled position if desired. Furthermore, it is also possible that the back portion 380 will be tilted or pivoted about the hinge axis 366 towards side portion 340 and the side portion 320 then will be pivoted about the folding axis 365 so that the side portion 320 will be oriented somewhat parallel to back portion 380. In this folded-up position the portions of the drawer require a very little space for transporting. On the other hand, those portions can be easily placed into the assembled position according to FIG. 8. It is also possible not to insert uprights 351 with the respective connecting elements 367 into their final positions in both side portions 320 and 340 for the purpose of transportation, but rather stack and store those structural components separately.

It will be understood that each of the elements described above, or two or more together, may also find a useful application in other types of drawers for furniture articles differing from the types described above.

While the invention has been illustrated and described as embodied in a drawer for a furniture article, it is not intended to be limited to the details shown, since various modifications and structural changes may be made without departing in any way from the spirit of the present invention.

Without further analysis, the foregoing will so full reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a drawer for an article of furniture, comprising a bottom portion, two guide rails laterally engaged with said bottom portion; a front sheeting; a pair of fastening means for fastening said front sheeting to a respective guide rail; a pair of parallel side portions laterally covering said guide rails; a back portion; said side portions each having substantially a U-shaped cross-section and overlapping and engaging with a respective guide rail, said back portion extending transversally of said side portions; and a pair of caps each mounted to a respective side portion at a front end thereof and engaged therewith, said side portions each having a front end and a rear end and having at the rear end a first recess which accommodates an end portion of said back portion, the improvement comprising that said side portions are mirror-inverted relative to a central longitudinal axis of the drawer and each has the same shape so that the positions of one side portion and the other side portion in the drawer can be interchanged, each side portion including at the front end a second recess formed identically to said first recess, the second recess of each side portion accommodating each of said fastening means, said caps being releasably connected to said front sheeting and entirely enclosing said second recesses and the fastening means received therein, each of said side portions at the front and rear end thereof having the cross-section of a rectangular hollow profile, each hollow profile opening towards said bottom portion and also at one side thereof, each side portion further including an outer wall, an upper wall of the same length as said outer wall, and an inner wall parallel to said outer wall and of the length shorter than that of the outer wall, at least one of said outer wall and said inner wall having an arm extended normally to said wall and formed at a free end of said wall, said outer wall having two free ends and said inner wall having two free ends, said outer wall further including two arms at free ends thereof and said inner wall further including two arms at free ends thereof, the arms of the outer wall projecting in the same direction as the arms of said inner wall, the arms of said outer wall and the arms of said inner wall of each side portion extending inwardly of the drawer, each arm of the outer wall defining with each arm of the inner wall in a direction of elongation of said side walls an opening, said outer wall and said upper wall of each side portion limiting said first and second recess at sides of the drawer and from above of the drawer, respectively.

2. The drawer as defined in claim 1, wherein the inner wall of each side portion is formed at each free end with a projection which extends in the direction of elongation of the side portion outwardly beyond the respective arm of the inner wall.

3. The drawer as defined in claim 2, wherein each opening defined between the arm of the outer wall and the arm of the inner wall at the rear end of each side portion has the width substantially corresponding to the width of said back portion, said end portions of said back portion being each slidably inserted into said opening so that the outer wall and the upper wall of each side portion secure said back portion against displacement.

4. The drawer as defined in claim 3, wherein said back portion is formed with two vertical grooves in which the projections of the inner walls of the side portions are engaged when said end portions are inserted into said openings, the outer wall of each side portion having an inner surface, the end portions of said back portion abutting against the inner surfaces of the outer walls of the side portions.

5. The drawer as defined in claim 3, wherein said back portion includes at two end portions thereof two uprights and at least one elongated connecting element clamped in said uprights.

6. The drawer as defined in claim 5, wherein said connecting element is a rod.

7. The drawer as defined in claim 5, wherein said connecting element is a profiled strip-like member.

8. The drawer as defined in claim 5, wherein said connecting element is a plate.

9. The drawer as defined in claim 2, wherein each of said caps is formed as a U-shaped shoe, each shoe having an inner arm and an outer arm parallel to said inner arm, said inner arm extending from said front sheeting to at least the arm of the inner wall of each side portion and overlapping the second recess of the respective side portion.

10. The drawer as defined in claim 9, wherein the height of each shoe corresponds to the height of each side portion.

11. The drawer as defined in claim 8, wherein the inner arm and the outer arm of each shoe is formed with a projection, the projections of the inner and outer arm of each shoe extending towards each other, said front sheeting having a backside, the projections of the inner and outer arm of each shoe abutting against said backside.

12. The drawer as defined in claim 9, wherein each of said has a front wall, said front sheeting having a backside, the front wall of each shoe abutting against the backside of said front sheeting.

13. The drawer as defined in claim 9, wherein said fastening means each includes a fastening member formed with two opposing grooves for slidably receiving said outer and inner arm of each shoe.

14. The drawer as defined in claim 12, wherein each of said shoes forms a fastening member which is metallic and is connected to the backside of the front sheeting, each fastening member being positioned in each second recess of the respective side portion adjustably engageable with the respective side portion at the front end thereof.

15. The drawer as defined in claim 1 wherein each side portion further has an elongated intermediate portion extended between the front end and the rear end of each side portion and formed integral therewith, said intermediate portion being formed of longitudinal parallel bars and having a hollow interior.

16. The drawer as defined in claim 15, wherein each intermediate portion further includes a subdivider insertable into said hollow interior.

17. The drawer as defined in claim 15, wherein each of said side portions is a single piece made of plastics.

18. The drawer as defined in claim 5, wherein each upright has a substantially rectangular cross-section.

19. The drawer as defined in claim 5, wherein each of said uprights is pivotable relative to said bottom portion and includes a connecting portion connected to said bottom portion and a hinge means which is a film hinge and has an axis, said upright being pivotable about said axis to said bottom portion.

20. The drawer as defined in claim 19, wherein said connecting portion has a first hook-like extension engageable with the respective upright and said back portion has a second hook-like extension engageable with said connecting portion.

21. The drawer as defined in claim 5, wherein each upright is formed of a number of individual wall portions connected to each other.

22. The drawer as defined in claim 21, wherein said wall portions are connected to each other by hinge joints.

23. The drawer as defined in claim 22, wherein said hinge joints are hinge films.

* * * * *